US010054440B2

(12) United States Patent
Egan

(10) Patent No.: US 10,054,440 B2
(45) Date of Patent: Aug. 21, 2018

(54) BUILDING PROFILE

(71) Applicant: Ezyprofile Systems Pty Ltd, Hamilton Island (AU)

(72) Inventor: Michael Kenneth Egan, Brisbane (AU)

(73) Assignee: Ezyprofile Systems Pty Ltd, Hamilton Island (AU)

( * ) Notice: Subject to any disclaimer, the term of this patent is extended or adjusted under 35 U.S.C. 154(b) by 108 days.

(21) Appl. No.: 15/026,699

(22) PCT Filed: Sep. 30, 2014

(86) PCT No.: PCT/AU2014/050258
§ 371 (c)(1),
(2) Date: Apr. 1, 2016

(87) PCT Pub. No.: WO2015/048850
PCT Pub. Date: Apr. 9, 2015

(65) Prior Publication Data
US 2016/0252349 A1    Sep. 1, 2016

(30) Foreign Application Priority Data

Oct. 1, 2013   (AU) .............................. 2013101313

(51) Int. Cl.
*G01C 15/10* (2006.01)
*G01C 15/06* (2006.01)
*E04G 21/18* (2006.01)
*F16M 11/32* (2006.01)
*E04G 21/00* (2006.01)

(52) U.S. Cl.
CPC ............. *G01C 15/06* (2013.01); *E04G 21/00* (2013.01); *E04G 21/1833* (2013.01); *F16M 11/32* (2013.01); *G01C 15/10* (2013.01)

(58) Field of Classification Search
CPC .... E04G 21/1833; G01C 15/06; G01C 15/00; F16M 11/041; F16M 11/046; F16M 11/2014; F16M 11/36; F16M 2200/066
USPC .................................................... 33/413, 1 LE
See application file for complete search history.

(56) References Cited

U.S. PATENT DOCUMENTS

| 2,245,901 | A | | 6/1941 | Chaskin | |
|---|---|---|---|---|---|
| 2,758,379 | A | | 8/1956 | Senk | |
| 3,668,781 | A | * | 6/1972 | Teter | ...................... A63C 19/08 |
| | | | | | 33/1 H |
| 3,861,046 | A | | 1/1975 | Arn | |
| 3,890,717 | A | * | 6/1975 | Haun | ..................... G01C 15/00 |
| | | | | | 33/1 LE |
| 4,095,343 | A | * | 6/1978 | McPhail | ............. E04G 21/1833 |
| | | | | | 33/1 LE |

(Continued)

FOREIGN PATENT DOCUMENTS

WO    WO9321409    10/1993

*Primary Examiner* — Yaritza Guadalupe-McCall
(74) *Attorney, Agent, or Firm* — DeLio, Peterson & Curcio, LLC; Peter W. Peterson

(57) ABSTRACT

The present invention is directed to a building profile including a pair of support legs, a cross member for removably fastening to the pair of support legs and from which a line can extend; a marker stand for engaging with the line, wherein the marker stand includes a point position marker for marking a position on the ground, a support for supporting the point position marker and an upright indicator for indicating whether the point position marker is in an upright position.

20 Claims, 12 Drawing Sheets

(56) References Cited

U.S. PATENT DOCUMENTS

| | | | | |
|---|---|---|---|---|
| 4,228,588 A | * | 10/1980 | Horton, Jr. | G01C 15/00 |
| | | | | 33/1 H |
| 4,290,207 A | | 9/1981 | Browning et al. | |
| 4,803,784 A | | 2/1989 | Miller | |
| 5,107,595 A | * | 4/1992 | Stay | E04G 21/1833 |
| | | | | 33/1 G |
| 5,657,548 A | * | 8/1997 | Kellar, Sr. | E04G 21/1833 |
| | | | | 33/1 H |
| 5,778,546 A | * | 7/1998 | Williamson | E04G 21/1833 |
| | | | | 33/1 H |
| 6,141,880 A | * | 11/2000 | Vircks | A63C 19/06 |
| | | | | 33/1 G |
| 6,490,803 B1 | | 12/2002 | Butters | |
| 7,137,207 B2 | * | 11/2006 | Armstrong | G01C 15/004 |
| | | | | 33/286 |
| 7,669,813 B2 | | 3/2010 | Crain et al. | |
| 2016/0252349 A1 | * | 9/2016 | Egan | F16M 11/32 |
| | | | | 33/413 |

* cited by examiner

BUILDING PROFILE

TECHNICAL FIELD

The present invention relates to a building profile.

BACKGROUND ART

During construction, boundaries and positions within a construction site are initially marked out using string (reference lines). These boundaries and positions can include the boundaries and positions of all foundations for external and internal walls, positions of sewerage pipes, entry points for power supply and the like. Typically, building profiles are first set up around the construction site to roughly mark out the construction area. Then strings are tied to the building profiles to mark out the specific boundaries and positions.

FIG. 1 illustrates a conventional construction site 100 in which building profiles 102 are used to mark out the boundaries and position for a proposed foundation 104. To erect each building profile 102, two or more stakes 106 are first driven into the ground. Then, a plank of timber 108 is attached between adjacent stakes 106 using nails. Once the appropriate positions are located on the plank of timber 108, for example by using laser or tape or the like, string 110 is secured to each profile 102 using nails 112 to mark the boundaries and position of the foundation 104.

When erecting conventional building profiles 102, it can often be difficult for a single builder to hold the stakes 106 and timber 108 in their correct positions before securing them to each other using a hammer and nails. Consequently, in many constructions sites, at least two builders would be required when erecting profiles, thus making the erection of building profiles 102 labour intensive and time consuming.

In addition, once the building profiles 102 are no longer needed, it is difficult and time consuming to individually remove the nails from the stakes 106 and timber 108 so that the profiles 102 can be disassembled for storage and reuse at the next construction site. For this reason, material used for building profiles 102 are often only used once before being discarded and wasted.

Moreover, a large number of stakes and timber planks may be required for a construction site, which can be heavy and bulky, thus making it difficult for a builder to transport and carry.

The object of the present invention is to provide an improved building profile which overcomes at least one of the above mentioned disadvantages.

It will be clearly understood that, if a prior art publication is referred to herein, this reference does not constitute an admission that the publication forms part of the common general knowledge in the art in Australia or in any other country.

SUMMARY OF INVENTION

According to the present invention, there is provided a building profile system including:
(a) a pair of support legs,
(b) a cross member for removably fastening to the pair of support legs and from which a line can extend; and
(c) a marker stand for engaging with the line,
wherein the marker stand includes a point position marker for marking a position on the ground, a support for supporting the point position marker and an upright indicator for indicating whether the point position marker is in an upright position.

Advantageously, the cross member can be conveniently fastened to the support legs by a single builder without the need for additional tools such as nails and hammers. In addition, the cross member can be conveniently and efficiently removed to disassemble the building profile for storage and reuse.

Each support leg may include a base which is a pointed end to facilitate driving the support leg into the ground in use. In other embodiments of the invention, each support leg may include a base which is adapted to be attached to vertical structures, such as walls. In these embodiments, the base may be a mounting plate with holes adapted to receive fasteners, such as bolts. In other forms of the invention, the base may include a suction cup for temporarily attaching the support legs to walls.

The cross member may include a pair of clamps, each clamp being located proximate a respective end of the cross member for fastening to a respective support leg. Each clamp may include an opening for receiving a respective support leg and a screw for engaging with the support leg. The screw may be operable in one direction to engage the support leg such that the cross member is fastened to the support leg, and the screw may be operable in an opposite direction to disengage with support leg such that the cross member is movable along the support leg.

The cross member may be a rail. The building profile may further include a marker for sliding along the cross member and marking a position on the cross member. The marker may include a sleeve for receiving a portion of the cross member such that the marker is slidable along the cross member. The marker may include a first slit for aligning the marker with an indicator on the cross member. The marker may include a second slit for aligning the marker with a reference line or an indicator on the ground. The marker may include a screw operable in one direction to engage with the cross member within the sleeve such that the marker is fixed relative to the cross member, and the marker may be operable in an opposite direction to disengage with the cross member such that the marker is movable along the cross member.

The marker may include attachment means for attaching one or more reference lines relative to the cross member. The attachment means may include a projection. The projection may include a neck portion such that reference lines can be wound around and attached to the neck portion.

The building profile may further include a laser holder for holding a laser marker. The laser holder may include a platform for supporting the laser marker, and a clamp for clamping the laser holder to the cross member.

The building profile may further include a line holder for holding reference lines. The line holder may include a rod for holding one or more coils of reference lines, and a clamp for clamping the line holder to the cross member.

The building profile may further include a paint can holder for holding a paint can. The paint can holder may include a cup for holding the paint can, and a clamp for clamping the paint can holder to a support leg.

The building profile may further include a level holder for holding a level. The level holder may include an elongate receptacle for holding the level, and a clamp for clamping the level holder to a support leg.

The building profile may further include end caps for mounting on an upper end of respective support legs.

The marker stand may include a point position marker for marking a position on the ground, and a tripod for supporting the point position marker in an upright orientation. The point position marker may be aligned with a ground reference point in use to mark out the ground reference point. The tripod may include length adjustable legs. The marker stand may include a level for indicating whether the point position marker is orientated vertically.

The building profile system may further include one or more connectors for connecting the cross member to a further cross member. The cross member may be connectable to a further cross member to provide an extended cross member.

Any of the features described herein can be combined in an combination with any one or more of the other features described herein within the scope of the invention.

The reference to any prior art in this specification is not, and should not be taken as an acknowledgement or any form of suggestion that the prior art forms part of the common general knowledge.

According to another aspect of the present invention, there is provided a method of making a building profile, the method comprising the steps of:
(a) defining the corners of a building with markers;
(b) placing a first pair of support legs adjacent to a marker at a first corner of the building profile;
(c) fastening a first cross member between the first pair of support legs;
(d) placing a second pair of support legs adjacent to another marker at a second corner of the building profile;
(e) fastening a second cross member between the second pair of support legs;
(f) positioning a pair of marker stands over the markers of the first corner of the building profile and the second corner of the building profile;
(g) adjusting the orientation of the marker stands to ensure that they are vertical;
(h) running a line between the first cross member and the second cross member, so that the string abuts the marker stands and defines a straight line for the building profile; and
(i) removing the marker stands and the markers, so that the position of the line now defines a boundary of a side of the building profile.

Preferably, the marker stand has tripod legs and the orientation of the marker stand is adjusted by adjusting the length of the tripod legs. More preferably, the marker stand has a spirit level to assist the adjustment of the orientation of the marker stand.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 1:
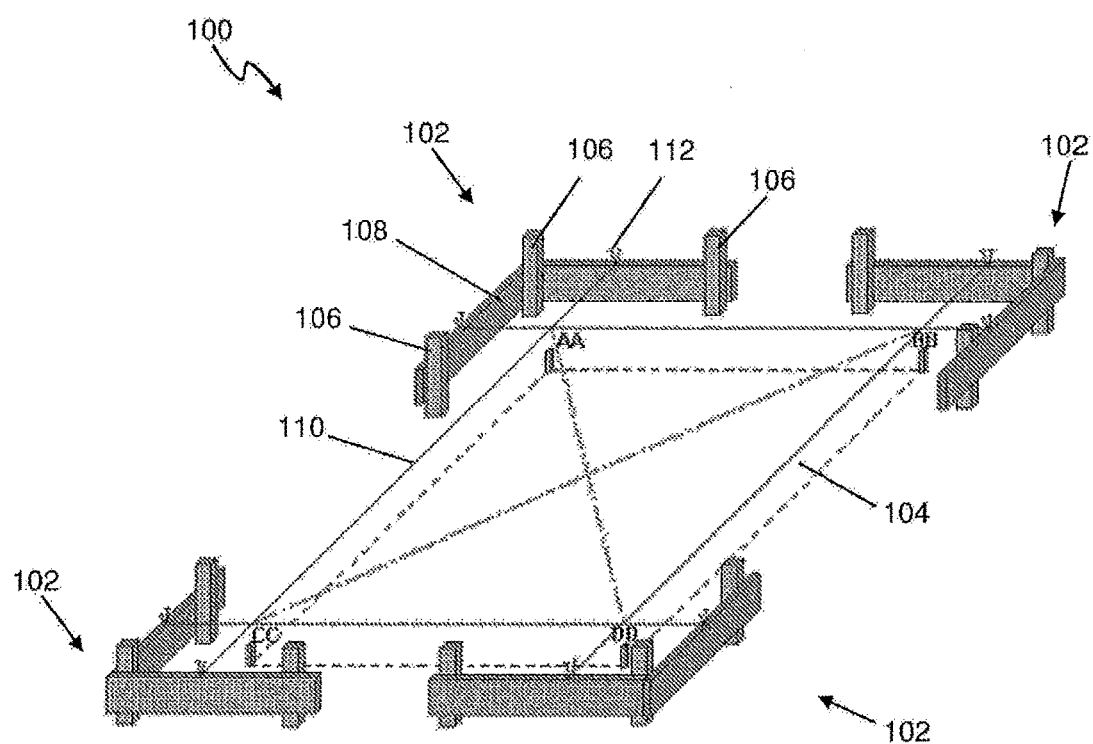
FIG. 1 is a schematic diagram of a construction site in which conventional building profiles are used to mark the site.
Figure 2:
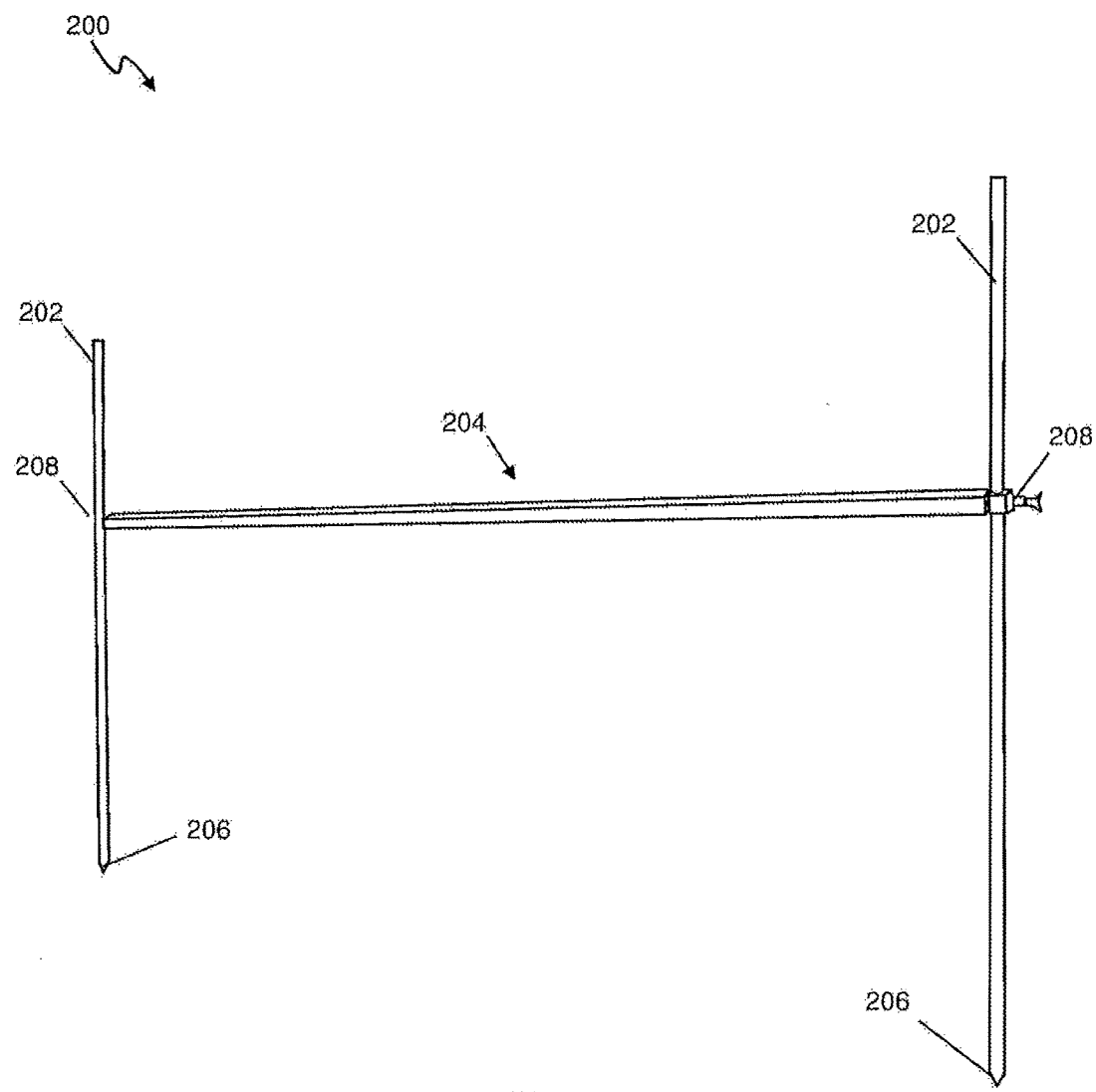
FIG. 2 is a perspective view of a building profile according to an embodiment of the present invention.

FIG. 2 illustrates a building profile 200 according to an embodiment of the present invention. The building profile 200 includes a pair of stakes (support legs) 202 and a rail (cross member) 204. Each stake 202 has a pointed end 206 to facilitate driving the stake 202 into the ground. Clamps 208 are located proximate each end of the rail 204 for removably fastening the rail 204 between the pair of stakes 202.

Figure 3:
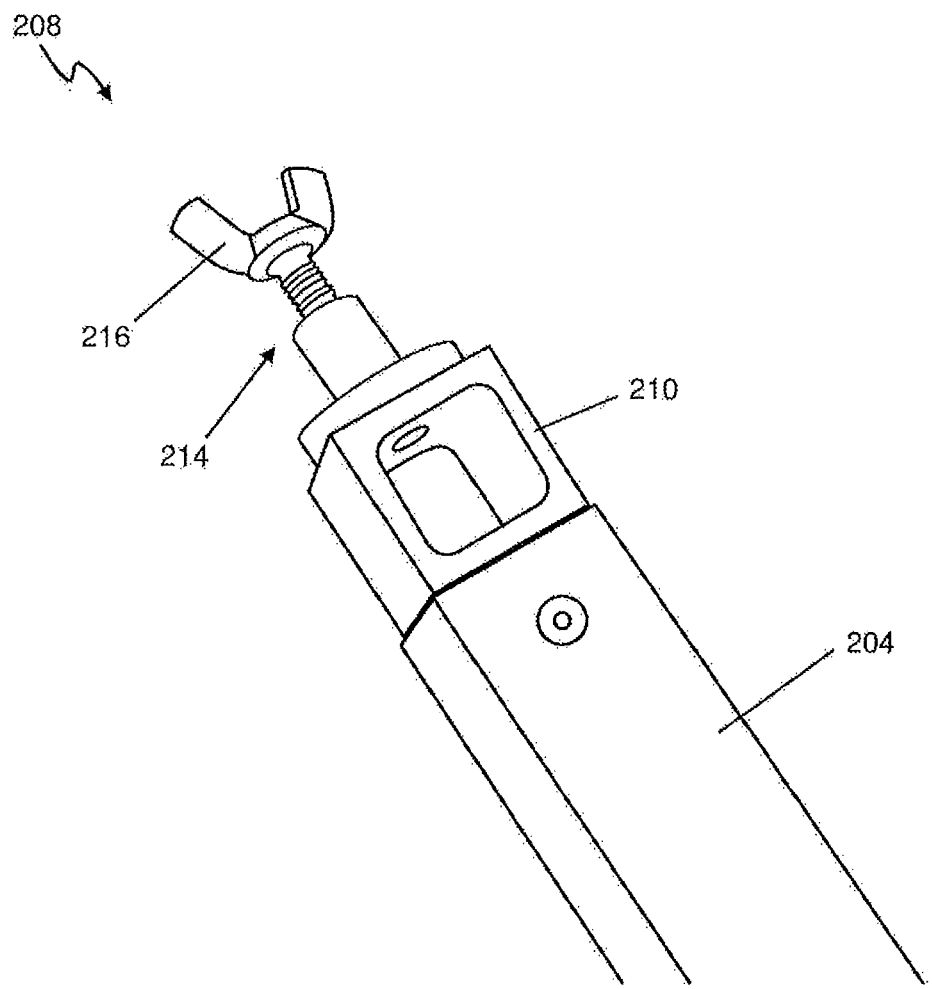
FIG. 3 is a perspective view of a clamp of a cross member of the building profile of FIG. 2.

As illustrated in further detail in FIG. 3, each clamp 208 includes a sleeve 210, and a screw 214 for securing a respective stake 202 within the sleeve 210. Elaborating further, the sleeve 210 is sized to receive and sliding along a respective stake 202. Once the sleeve 210 is moved to a desired location on the stake 202, the screw is turned in one direction to engage with the stake 202 such that the stake 202 is clamped between an inner end of the screw 214 and an internal wall of the sleeve 210. To release the stake 202 from the clamp 208, the screw 214 is turned in an opposite direction such that the inner end of the screw 214 is disengaged with the stake 202. The clamp 208 also includes a wing nut 216 mounted to an outer end of the screw 214 to facilitate turning of the screw 214.

Figure 4:
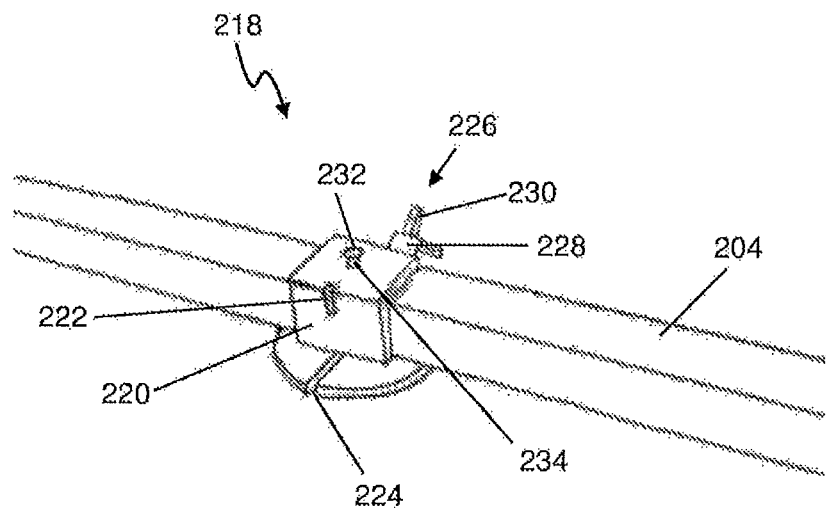
FIG. 4 is a perspective view of a marker mounted on a cross bar of the building profile of FIG. 2.

FIG. 4 illustrates a marker 218 which is slidable along the rail 204 for marking a position on the rail 204. The marker 218 includes a sleeve 210 for receiving a portion of the rail 204 such that the marker 218 is slidable along the rail 204. The marker 218 includes a first slit 222 for aligning the marker 218 with an indicator or marked position (not shown) on the rail 204. The marker 218 also includes a second slit 224 for aligning the marker 218 with a reference line or the like (not shown).

The marker 218 includes a clamp 226 for clamping the marker 218 to the rail 204. The clamp 226 operates in a similar way to clamps 208 of the rail 204. In particular, the clamp 226 includes a screw 228 (hidden) for engaging and disengaging with the rail 204. Once the sleeve 220 is moved to a desired location on the rail 204, the sleeve 220 is temporarily secured in place by turning the screw 228 in one direction such that the rail 204 is clamped between an inner end of the screw 228 and an internal wall of the sleeve 220. To release the rail 204 from the clamp 226, the screw 228 is turned in an opposite direction until the screw 228 is no longer engaged with the rail 204 and the sleeve 220 is freely movably along the rail 204. The clamp 226 also includes a wing nut 230 mounted to an outer end of the screw 228 to facilitate turning of the screw 228.

The marker 218 further includes a projection 232 to facilitate attachment of one or more reference lines to the marker 218. The projection 232 includes a neck portion 234 so that reference lines can be wound around the neck portion for attachment to the marker 218.

Figure 5:
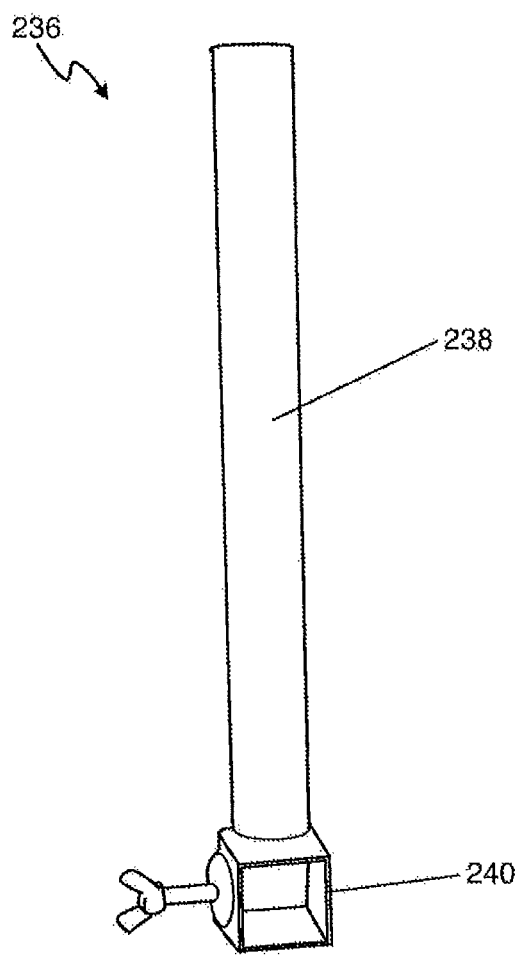
FIG. 5 is a perspective view of a line holder for mounting to a cross bar of the building profile of FIG. 2.

FIG. 5 illustrates a line holder 236 for holding one or more coils of string (reference lines) (not shown). The line holder 236 includes a rod 238 for holding one or more coils of string (not shown) and a clamp 240 for removably securing the line holder 236 to the rail 240. The clamp 240 functions in the same manner as the clamp 226 of the marker 218 as previously described.

Figure 6:
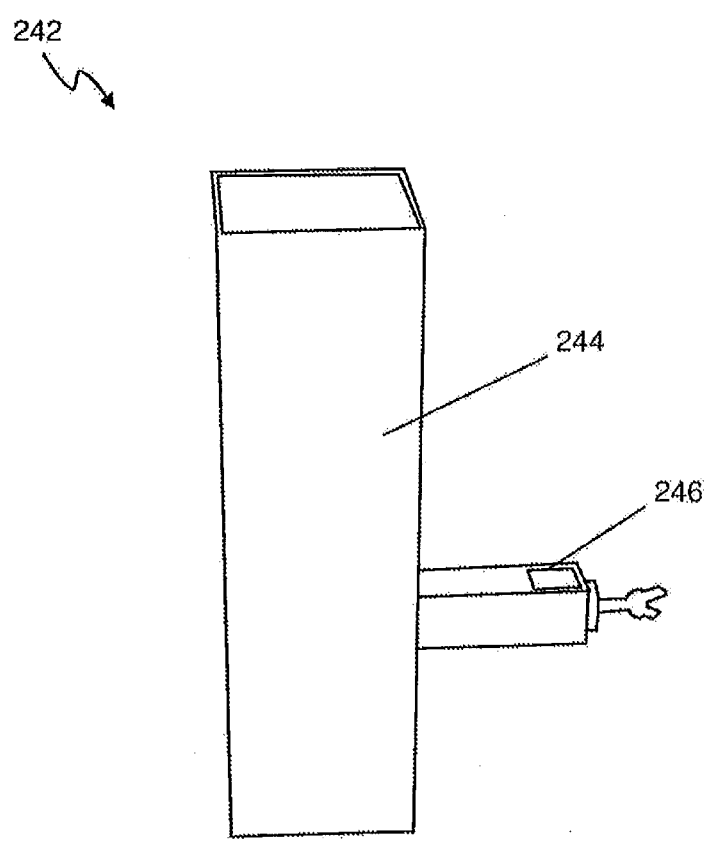
FIG. 6 is a perspective view of a level holder for mounting to a support leg of the building profile of FIG. 2.

FIG. 6 illustrates a level holder 242 for holding a level (not shown). The level holder 242 includes an elongate receptacle 244 for holding the level, and a clamp 246 for clamping the level holder 242 to a stake 202. The clamp 246 functions in the same manner as a clamp 208 of the rail 204 as previously described.

Figure 7:
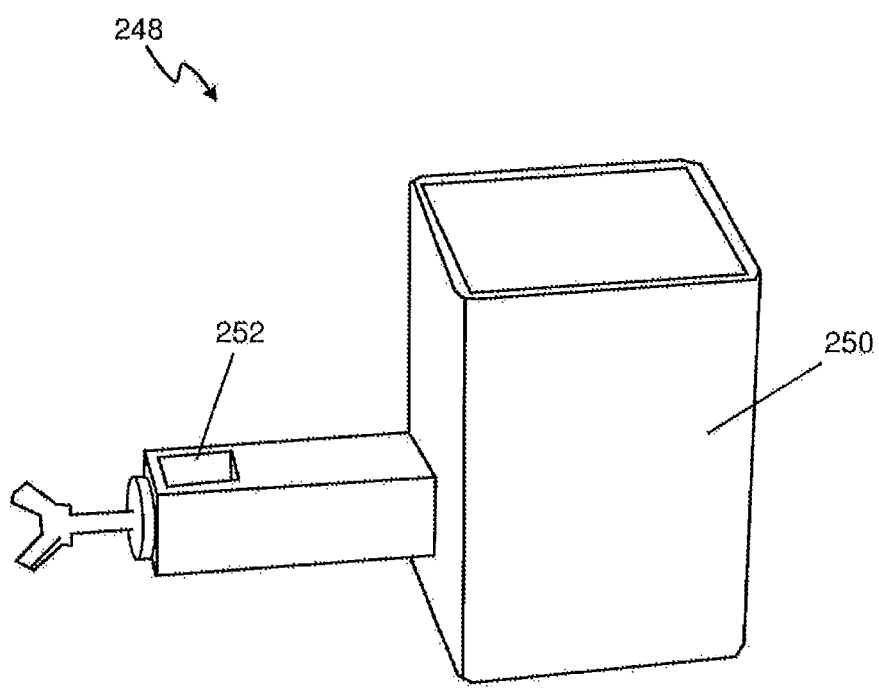
FIG. 7 is a perspective view of a paint can holder for mounting to a support leg of the building profile of FIG. 2.

FIG. 7 illustrates a paint can holder 248 for holding a paint can (not shown). The paint can holder 218 includes a cup 250 for holding the paint can, and a clamp 252 for clamping the paint can holder 250 to a stake 202. The clamp 252 functions in the same manner as a clamp 208 of the rail 204 as previously described.

To erect a building profile 200 on a construction site, one or more markers 218 (see FIG. 4) are positioned on a rail 204. The rail 204 is then positioned on the ground with the first and second slit 222, 220 facing the construction site. A first stake 202 is driven into the ground in a position aligned with one of the clamps 208 of the rail 204. Then, the sleeve 210 of one of the clamps 208 of the rail 204 is slotted over the first stake 202, and the sleeve 210 of the other clamp 208 of the rail 204 is slotted over the second stake 202. The second stake 202 is then inserted into the ground with the rail 204 attached. Once both stakes 202 are mounted to the ground, the rail 204 is moved to a desired height and secured in place between the stake 202 by tightening the clamps 208. One or more other profiles 200 can be erected in the same manner as required around the constructions site.

Once all of the building profiles 200 are erected around the construction site, measuring tools such as tape, lasers and the like can be used to determine the appropriate positions on the rails 204. A pen or paint can be used to mark out the appropriate positions on each rail 204 as indicators for the markers 218. The markers 218 can then be moved such that the first slit 222 of each marker 218 is aligned with the corresponding marked positions on the rails 204 before each marker 218 is secured in place using the clamp 226. String can then be tied to the projections 232 of the markers 218 to mark out the boundaries and positions for the construction site.

Figure 8:
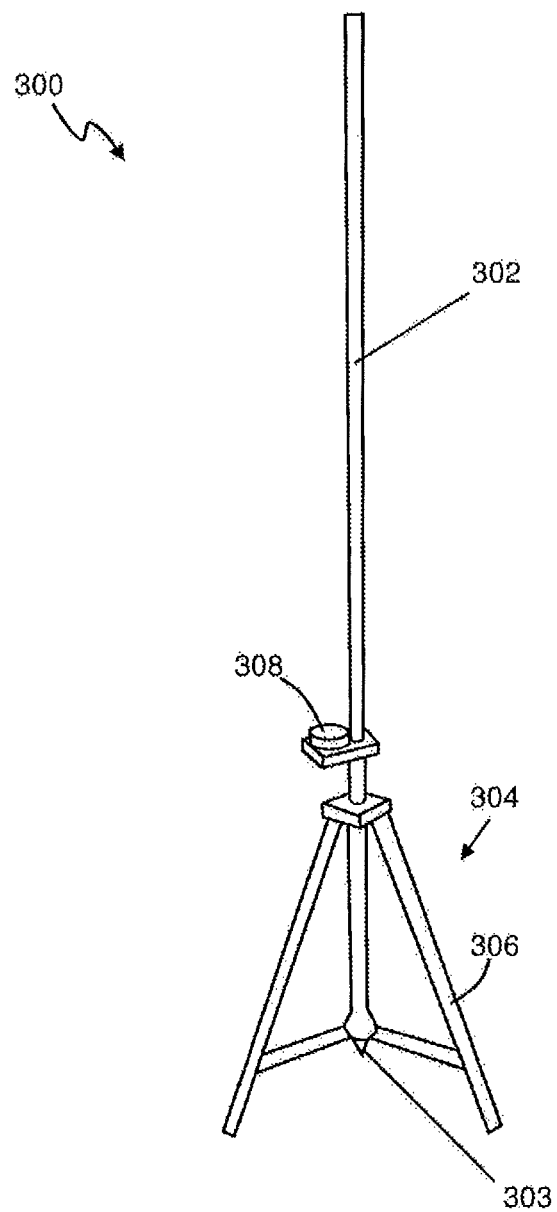
FIG. 8 is a perspective view of a marker stand of a building profile system according to an embodiment of the present invention.

FIG. 8 illustrates a marker stand 300 for marking a position on the ground. The marker stand 300 can be used together with one or more building profiles 200 to determine the position of a reference line. The marker stand 300 includes a point position marker 302 for marking a position on the ground, and a tripod 304 for supporting the point position marker 302 in an upright orientation. When using the marker stand 300, the lower end 303 of the point position marker 302 is aligned with a ground reference point so as to mark out the ground reference point. The tripod 304 includes length adjustable legs 306. During use, the length of each leg 306 is adjusted according to a level 308 to ensure that the tripod 304 is supporting the point position marker 302 in a vertical orientation.

Figure 9:
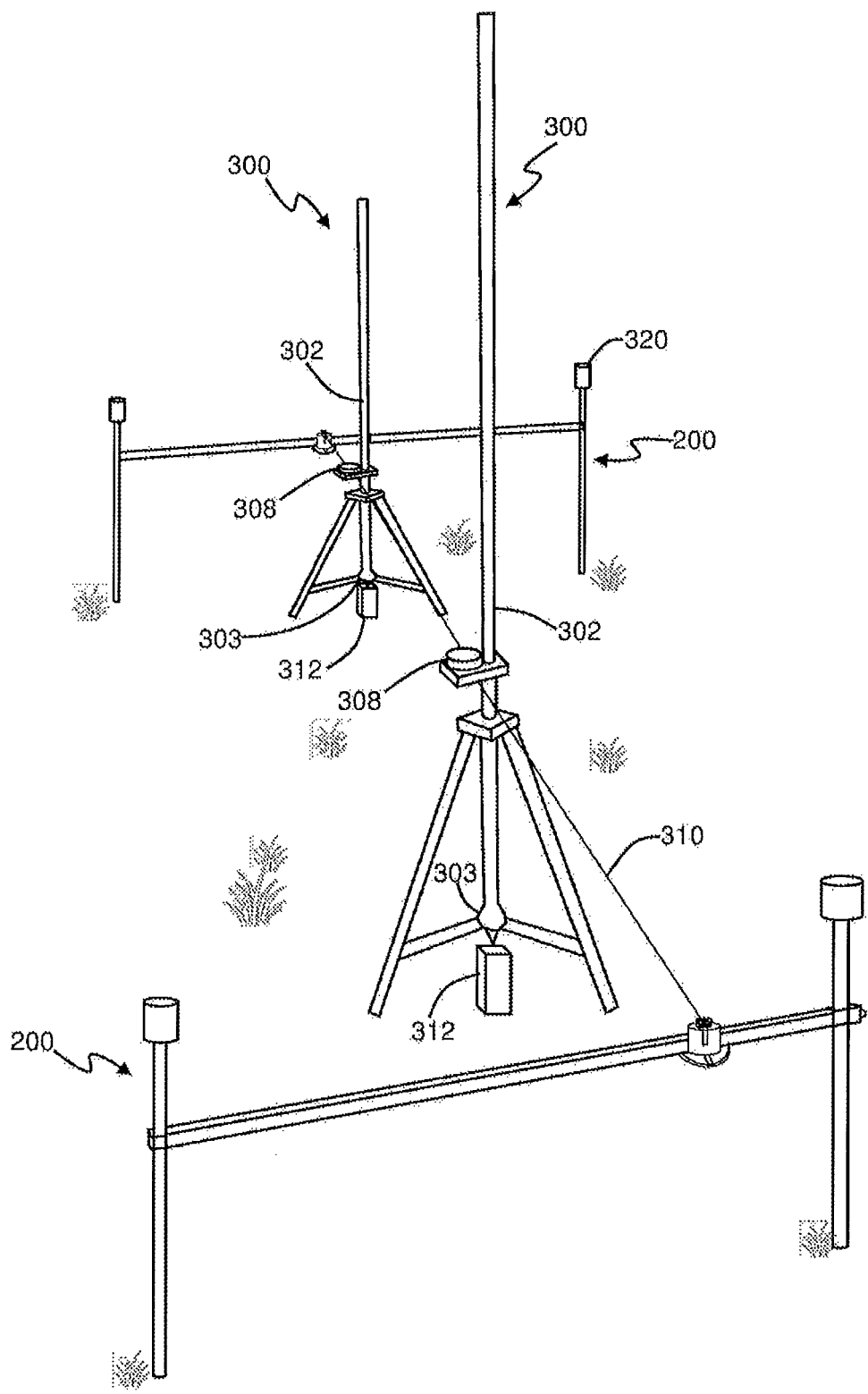
FIG. 9 illustrates a construction site set up in which a building profile system according to an embodiment of the present invention is used to locate a reference line.

A method of using the marker stand 300 to determine a reference line 310 will now be explained with reference to FIG. 9. At a construction site as shown in FIG. 9, a set of pegs 312 is used to mark out reference positions on the ground. In one example, the reference position can relate to a corner of a concrete slab. Marker stands 300 are first positioned over the pegs 312 so that the lower ends 303 of the point position markers 302 are aligned with the pegs 312. The length of each leg 306 of the tripod 304 is then adjusted according to the level 308 such that the point position marker 302 is oriented vertically. In the same manner, a further marker stand 300 is positioned over a further peg marking out a further reference position, for example relating to another corner of the concrete slab.

Once both marker stands 300 are properly positioned, the position of a piece of string 310 is attached to a pair of building profiles 200 erected on opposite ends of the construction site can be adjusted so that the piece of string 310 is in contact with the point position marker 302 of each marker stand 300. In this manner, a reference line 310, for example marking a side of a concrete slab, is determined.

In situations where only a single reference position on a construction site is initially known, it is often desirable to determine all reference lines, for example, corresponding to four sides of a proposed rectangular concrete slab, by first determining a right angle corresponding to a right angle corner of the rectangular concrete slab. A method of determining a right angle using a building profile system according to an embodiment of the present invention will now be described with reference to FIG. 10.

Figure 10:
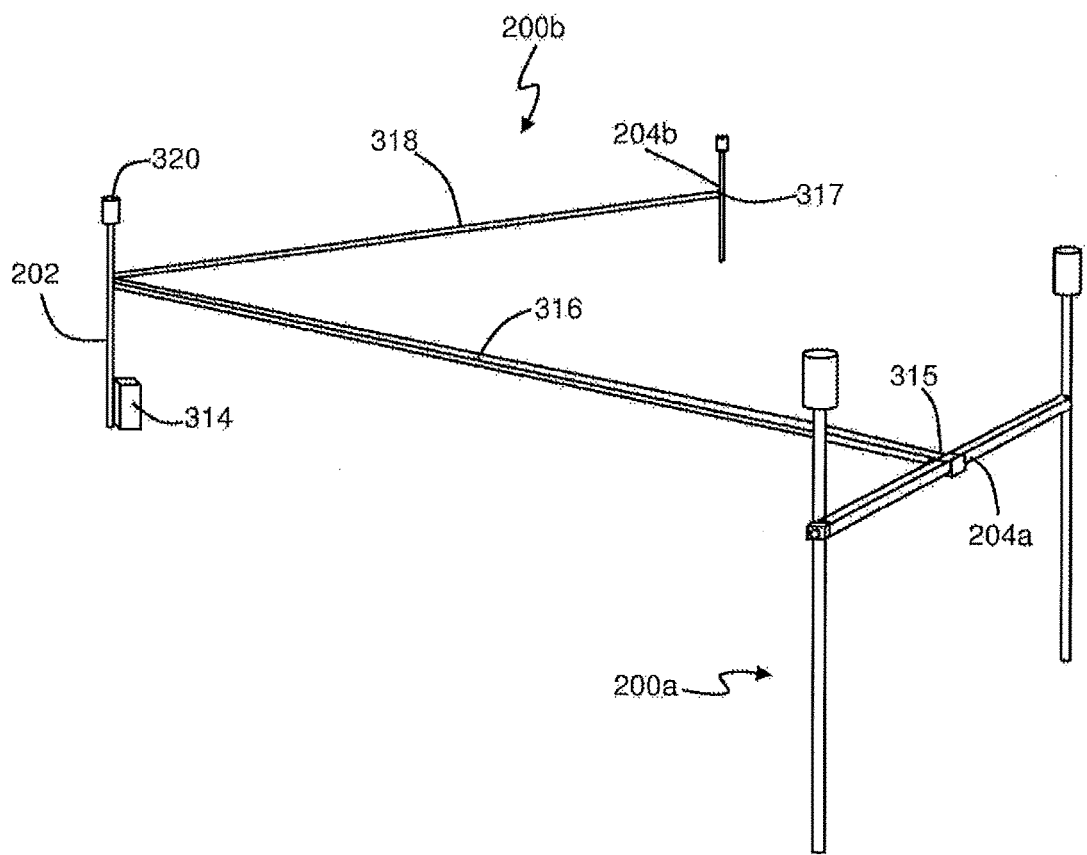
FIG. 10 illustrates a construction site set up in which a building profile system according to an embodiment of the present invention is used to determine a right angle.

As shown in FIG. 10, a stake 202 is first inserted into the ground adjacent the peg 314. Then, three rails 204 are joined together to form a first extended rail 316. The extended rail 316 is positioned along a first direction extending from the peg 314. One end of the first extended rail 316 is clamped to the stake 202 and the opposite end 315 of the rail 316 is clamped onto the rail 204a of a building profile 200a. Then, four rails 204 are joined together to form a second extended rail 318. The second extended rail 318 is positioned along a second direction extending from the peg 314, generally perpendicular to the first extended rail 316. One end of the rail 318 is clamped to the stake 202 and the opposite end 317 of the rail 318 is clamped onto the rail 204b of a further building profile 200b.

Based on Pythagoras theorem, a right angled triangle having two sides aligned with the first extended rail 316 and the second extended rail 318, respectively, should have a diagonal equal to five rails in length. A tape measure can therefore be used to measure the length of the diagonal connecting the two ends 315, 317 of the extended rails 316, 318. The position of the ends 315, 317 can be adjusted by sliding the connections between the extended rails 316, 318 and the rails 204a, 204b of the respective profiles 200a, 200b until the length of the diagonal connecting the ends 315, 317 is equal to the length of five rails. Once the positions of the ends 315, 317 are located, the ends 315, 317 can be fixed in place using clamps. A right angle between the two extended rails 316, 318 is thereby determined.

As shown in FIGS. 9 and 10, end caps 320 are mounted on the exposed end of each stake 202 for workplace health and safety.

Figure 11:
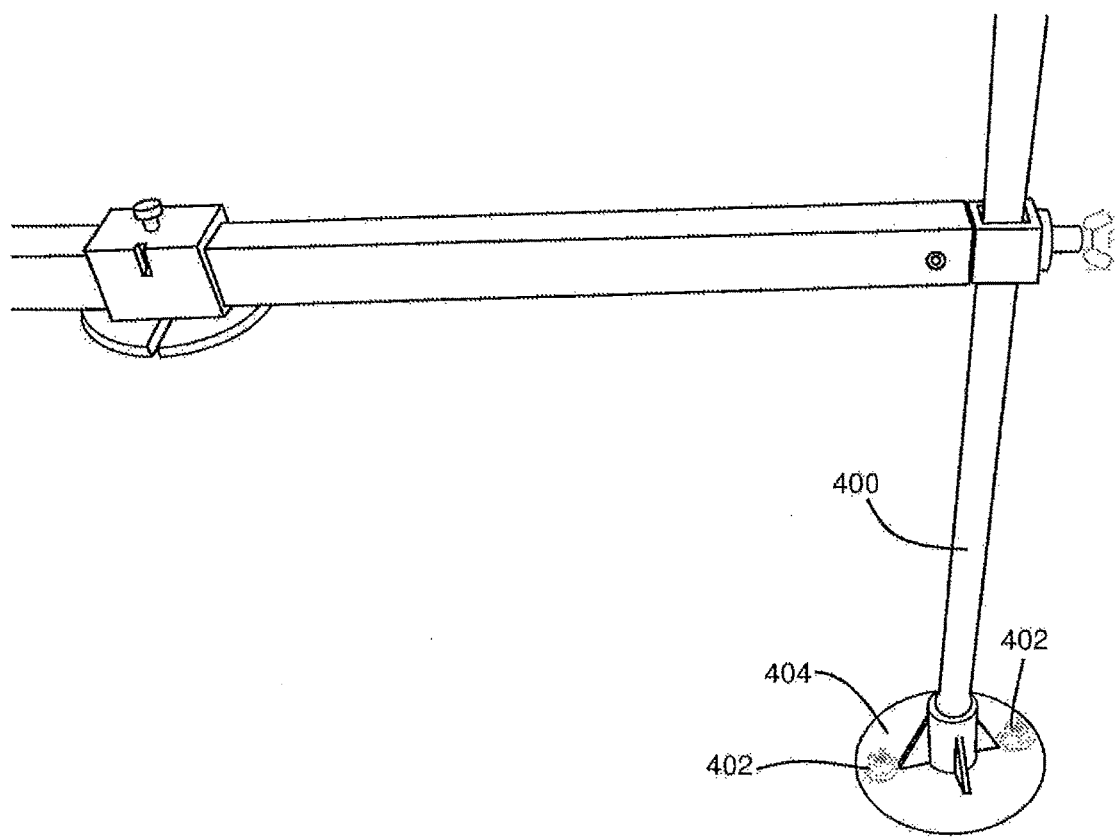
FIG. 11 shows a perspective view of support leg with a base for attachment to the floors of existing structures.

As shown in FIG. 11, a support leg 400 for a building profile can be attached to a solid foundation (such as a concrete floor) using bolts 402 connected to the mounting plate 404 at the base of each support leg (rather than a stake inserted into the ground). This form of the invention may be useful where a builder is making an extension to an existing building. In that instance, the building profile has to abut the existing building, and therefore a stake cannot be inserted into the ground at the appropriate place because of the foundations of the existing building.

By way of another example, in a shopping centre development, a builder may need to divide the interior space of the shopping centre into multiple different shops, which would require building profiles. Although the bolts on the mounting plate of the each support leg will damage the flooring of the original building, this damage can be readily repaired with concrete after the building profile has been defined. Often the original concrete floor of a building is covered with tiles or another surface which would hide any superficial damage to the floor caused by the mounting plates. If the original floor is a timber floor, then the mounting plates 404 can be screwed to the timber, or even affixed to the floor with a suction cap to avoid damaging to the original floor.

Figure 12:
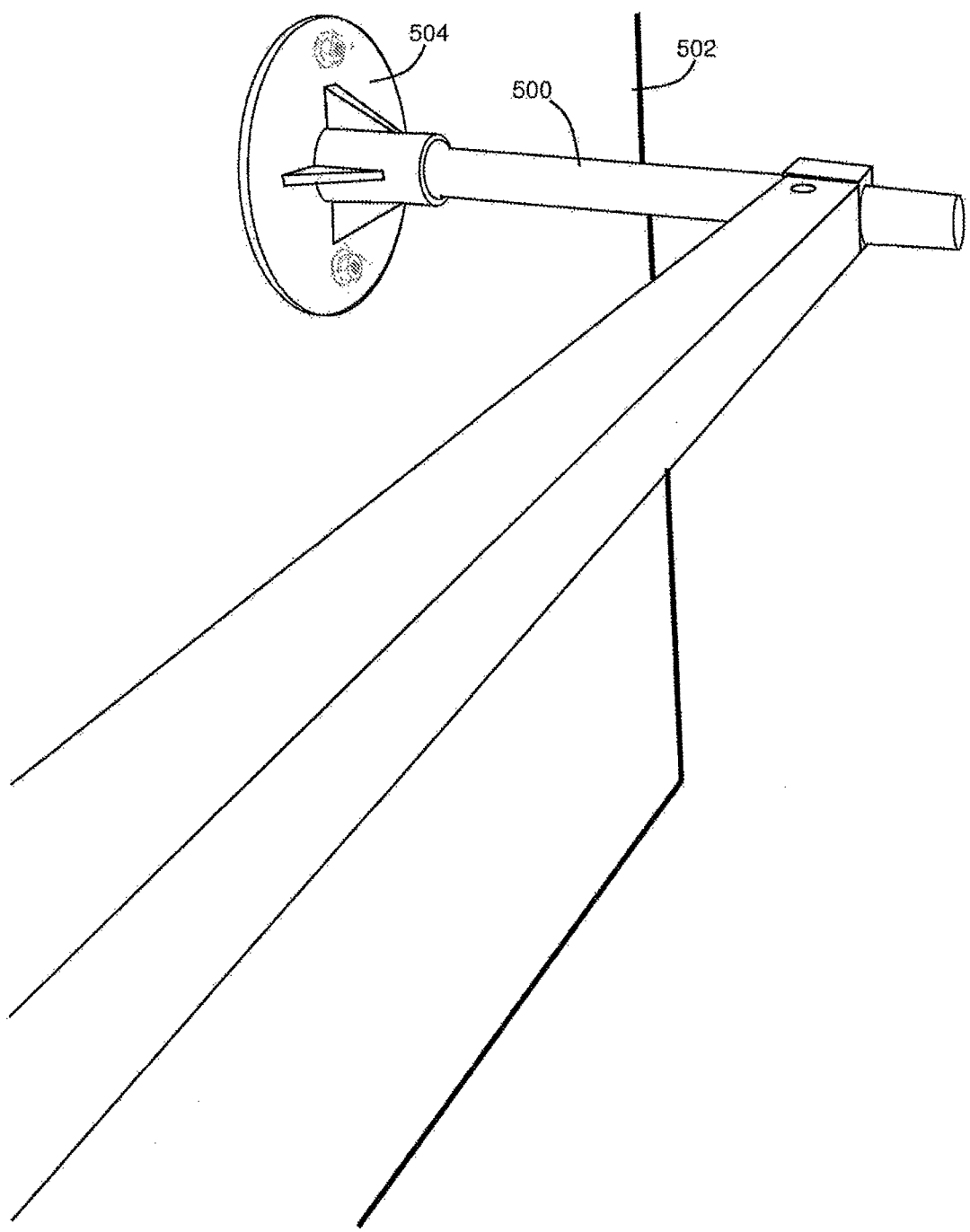
FIG. 12 shows a perspective view of support legs with a base for attachment to the walls of existing structures.

As shown in FIG. 12, a building profile can also be attached to the walls of an existing building. In that instance, the support legs 500 could be screwed onto the wall 502 of the existing building through the mounting plates 504. For instance, when building a room indoors within an existing building, a builder may need to define the boundary of the new room. There may not be enough space between the ground and the wall of the building for a standard building profile attached to the floor, so the building profile can be attached to the wall using screws or any other method. The same methodology can be applied outdoors when there is not enough space between the ground and a fence of an existing building for a standard building profile.

Components of the building profile system can be made from any suitable lightweight material to facilitate ease of storage and handling. The materials used for the building profile systems could include fibre glass, various metals, plastics and composite materials which are light weight, strong and durable. The components of the building profile system of the present invention can be disassembled and packed away in a bag, which is easy and convenient for a builder to carry and transport.

In one embodiment, each rail 204 is 1 meter in length. In one embodiment, the clamps 208 on each rail 204 can be removed to allow any suitable number of rails 204 to be connected together to form an extended rail. In particular, adjacent rails 204 can be connected together by inserting an end portion of a first rail 204 having a smaller cross section into a hollow end portion of a second rail 204 having a larger cross section. Alternatively, connectors having sleeves can be used to connect two adjacent rails 204 together. In some embodiments, the connecters include clamps. In a further embodiment, each rail 204 can be length adjustable. For example, each rail 204 can be foldable or telescopic.

Advantageously, the cross member can be conveniently fastened to the support legs by a single builder without the need for additional tools such as nails and a hammer. In addition, the cross member can be conveniently and efficiently removed to disassemble the building profile for storage and reuse.

Moreover, the markers 218 can be conveniently moved into a desired location on a rail 204 of a building profile 200 to facilitate the attachment of string, without the use of additional tools such as nails and a hammer.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A building profile system including:
   a pair of support legs;
   a cross member for removably fastening to the pair of support legs and from which a line can extend;
   a removably fastenable marker comprising:
      a sleeve adapted to slide along the cross member:
      a marking aperture formed in the sleeve for exposing a portion of the cross member for marking or reading a mark;
      a projection mounted upon the sleeve for retaining the end of the line;
   a marker stand for engaging with the line, wherein the marker stand includes a point position marker for identifying a position on the ground, a support for supporting the point position marker and an upright indicator for indicating whether the point position marker is in an upright position; and
   a reference line slot which extends outwardly from the sleeve and associated cross member such that when a reference line is tied to the projection and aligned in the reference slot, the reference line should also be in line with the marking aperture;
   wherein the marker can be rotated so that the reference line can be attached in a vertical or horizontal position relative to the cross member.

2. The system of claim 1, further including a marker for sliding along the cross member for marking a position on the cross member, wherein the marker includes a platform for holding a laser.

3. The system of claim 2, further including a line holder comprising a rod for holding one or more coils of reference lines and a clamp for clamping the line holder to the cross member.

4. The system of claim 1, wherein the upright indicator is a spirit level.

5. The system of claim 1, wherein the support is a tripod.

6. The system of claim 5, wherein the tripod has legs of adjustable length.

7. A method of making a building profile using the system of claim 1 wherein the method comprises the steps of: (a) defining the corners of a building with identification marks; (b) placing a first pair of support legs adjacent to an identification mark at a first corner of the building profile; (c) fastening a first cross member and marker between the first pair of support legs; (d) placing a second pair of support legs adjacent to another identification mark at a second corner of the building profile; (e) fastening a second cross member and marker between the second pair of support legs; (f) positioning a pair of marker stands over the identification marks of the first corner of the building profile and the second corner of the building profile; (h) adjusting the orientation of the marker stands to ensure that they are vertical; attaching a reference line between the projections of the first marker and the second marker, (i) adjusting the position of the markers so that the reference line abuts the marker stands and defines a straight line for the building profile; and (j) removing the marker stands and the identification marks, so that the position of the line now defines the boundary of a side of the building profile.

8. The method of claim 7, wherein the marker stands have tripod legs and the orientation of the marker stands can be adjusted by adjusting the length of the tripod legs.

9. The method of claim 7, wherein the marker stands have a spirit level to assist the adjustment of the orientation of the marker stands.

10. The method of claim 7 wherein the method is able to be carried out by a single person.

11. The method of claim 10 wherein the steps of fastening the cross members to the support legs and the step of adjusting the position of the markers can be carried out by one person without the need for additional tools including tools such as nails and a hammer.

12. The system of claim 1 wherein the system further comprises end caps for capping the top ends of the support legs.

13. A building profile system including:
a pair of support legs;
a base for the support legs for attaching the support legs to vertical structures;
a cross member for removably fastening to the pair of support legs and from which a line can extend;
a removably fastenable marker comprising:
  a sleeve adapted to slide along the cross member:
  a marking aperture formed in the sleeve for exposing a portion of the cross member for marking or reading a mark;
  a projection mounted upon the sleeve for retaining the end of the line; and
  a marker stand for engaging with the line, wherein the marker stand includes a point position marker for identifying a position on the ground, a support for supporting the point position marker and an upright indicator for indicating whether the point position marker is in an upright position.

14. The system of claim 13, wherein the base is a mounting plate with holes adapted to receive fasteners.

15. The system of claim 13, wherein the base includes a suction cup.

16. A building profile system including:
a pair of support legs;
a cross member for removably fastening to the pair of support legs and from which a line can extend;
one or more connectors for connecting the cross member to a further cross member;
a removably fastenable marker comprising:
  a sleeve adapted to slide along the cross member:
  a marking aperture formed in the sleeve for exposing a portion of the cross member for marking or reading a mark;
  a projection mounted upon the sleeve for retaining the end of the line; and
  a marker stand for engaging with the line, wherein the marker stand includes a point position marker for identifying a position on the ground, a support for supporting the point position marker and an upright indicator for indicating whether the point position marker is in an upright position.

17. A building profile system including:
a pair of support legs;
a cross member for removably fastening to the pair of support legs and from which a line can extend, where the cross member has at its end a clamp comprising an opening for receiving a support leg therethrough and a screw which is adapted to be turned by hand for forming a frictional connection between the clamp and support leg;
a removably fastenable marker comprising:
  a sleeve adapted to slide along the cross member:
  a marking aperture formed in the sleeve for exposing a portion of the cross member for marking or reading a mark;
  a projection mounted upon the sleeve for retaining the end of the line; and
  a marker stand for engaging with the line, wherein the marker stand includes a point position marker for identifying a position on the ground, a support for supporting the point position marker and an upright indicator for indicating whether the point position marker is in an upright position.

18. The system of claim 17 wherein the cross members can be joined together to form an extended cross member.

19. The system of claim 18 wherein the clamps at the end of the cross members are removably inserted into the ends of the cross members and when removed, allow two cross members to be joined into an extended cross member.

20. The system of claim 19 wherein the two ends of the cross members are joined by the additional use of a connective sleeve that optionally includes a pair of clamping screws.

* * * * *